(12) United States Patent
Ichikawa

(10) Patent No.: US 12,528,172 B2
(45) Date of Patent: Jan. 20, 2026

(54) CARTRIDGE TOOL SET

(71) Applicant: BIB Creative Co., Ltd., Xiushui Township, Changhua County (TW)

(72) Inventor: Tomonari Ichikawa, Xiushui Township (TW)

(73) Assignee: BIB CREATIVE CO., LTD., Changhua County (TW)

( * ) Notice: Subject to any disclaimer, the term of this patent is extended or adjusted under 35 U.S.C. 154(b) by 418 days.

(21) Appl. No.: 18/080,133

(22) Filed: Dec. 13, 2022

(65) Prior Publication Data
US 2023/0202016 A1    Jun. 29, 2023

(30) Foreign Application Priority Data

Dec. 15, 2021 (TW) .................................. 110214944
May 10, 2022 (TW) .................................. 111204785

(51) Int. Cl.
*B25F 1/02* (2006.01)
*B25B 7/08* (2006.01)
*B25B 13/06* (2006.01)
*B25B 15/02* (2006.01)

(52) U.S. Cl.
CPC ................... *B25F 1/02* (2013.01); *B25B 7/08* (2013.01); *B25B 13/06* (2013.01); *B25B 15/02* (2013.01)

(58) Field of Classification Search
CPC ..... B25B 27/0071; B25B 13/06; B25B 15/02; B25B 13/08; B25F 1/02
See application file for complete search history.

(56) References Cited

U.S. PATENT DOCUMENTS

| | | | | |
|---|---|---|---|---|
| 5,979,532 | A * | 11/1999 | Wridt ..................... | B60C 25/02 157/1.1 |
| 8,960,700 | B2 * | 2/2015 | Ellis ......................... | B62J 11/22 280/276 |
| 9,498,870 | B2 * | 11/2016 | Davis ....................... | B25F 1/02 |
| 10,821,789 | B2 * | 11/2020 | Kerner .................... | B29C 73/08 |
| 10,913,317 | B2 * | 2/2021 | Kerner .................... | B60C 29/04 |
| 10,940,725 | B2 * | 3/2021 | Kerner .................... | B60C 29/04 |
| 11,518,011 | B2 * | 12/2022 | Klampfl ................... | B25G 1/08 |
| 11,833,654 | B2 * | 12/2023 | Pfeiffer ............... | B25B 27/0071 |
| 2013/0180053 | A1 * | 7/2013 | Rubin ................ | B25B 27/0071 7/118 |
| 2014/0109728 | A1 * | 4/2014 | McRorie, III .......... | B60C 25/02 81/15.2 |
| 2018/0141396 | A1 * | 5/2018 | Kerner .................... | B60C 25/16 |
| 2021/0060744 | A1 * | 3/2021 | Klampfl ................ | B25B 13/461 |
| 2023/0129587 | A1 * | 4/2023 | Chuang .................... | B25F 1/00 7/138 |

* cited by examiner

*Primary Examiner* — David B. Thomas

(74) *Attorney, Agent, or Firm* — MUNCY, GEISSLER, OLDS & LOWE, P.C.

(57) ABSTRACT

A cartridge tool set comprising a body having a joint portion at each end of the body, the joint portion having a screw hole axially recessed on the end face of the joint portion, the screw hole having a screw surface formed on the inner surface of the screw hole; and a tool portion detachably connected to a tool member.

17 Claims, 9 Drawing Sheets

CARTRIDGE TOOL SET

FIELD OF INVENTION

A tool, more particularly, a cartridge tool set.

BACKGROUND OF THE INVENTION

As modern people increasingly attach importance to environmental protection and leisure lifestyle, a bicycle has become not only a means of transportation but also an extremely popular piece of sports equipment. When riding a bicycle, it is inevitable to encounter unexpected situations, such as a flat tire, a fallen chain, a loose bolt on the bicycle body, etc. In order to cope with the above unexpected situations, it is necessary to carry with your equipment such as a pump cylinder, a screw locking tool, etc. However, the above-mentioned equipment is often disorganized and difficult to store when carried together, and it also easily becomes a burden for cyclists who are looking for lightness. Therefore, the development of multi-functional and portable bicycle repair tools has become the main research and development goal of the related industry.

SUMMARY OF THE INVENTION

In order to provide a multi-functional and portable bicycle repair tool, the present invention provides a cartridge tool set comprising a body whose two ends include: a joint portion having a screw hole recessed on the end face of the joint portion; and a tool portion which is a tool structure or a tool combination structure, wherein the tool combination structure being used for detachably connecting to a tool member.

Wherein, the tool combination structure comprises a tool perforation, and the tool perforation penetrates the tool portion in a radial direction.

Wherein, the tool combination structure is used for detachably connecting to a conventional screwdriver head.

Wherein, the tool perforation cross-section is a hexagonal perforation.

Wherein, the tool structure extends in a longitudinal direction and protrudes from a free end of the tool portion, and the thickness of the tool structure gradually thins in the longitudinal direction to form a flattened shape, wherein, the end of the tool structure is deformed toward one of the sides of the flattened shape to form a tire levering structure.

Wherein, the tool structure is a tool notch recessed in any edge of the tool portion, wherein the contour of the tool notch can be concave and convex to fit at least a part of a conventional nut.

Wherein, the tool structure is a tool notch recessed in any edge of the tool portion, wherein an opening formed by the tool notch can be equal in size to the diameter of a valve cap on one of the tires of a conventional bicycle.

Wherein, the tool structure is a tool notch recessed in any edge of the tool portion, wherein the opening formed by the tool notch is slightly larger than the width of one of the chains of the bicycle.

Wherein, the tool perforation is connected to the screw hole.

Wherein, the tool member is in the shape of a rod having a tool structural end and a large diameter end formed at each end, the large diameter end having at least one diameter larger than the tool perforation; and when the tool member is connected to the tool portion, the tool structural end passes through the tool perforation via the screw hole and protrudes axially from the tool member, and the large diameter end remains in the screw hole and abuts against the tool perforation.

Wherein, one side of the tool perforation is connected to the opening of the screw hole, and the tool member is placed in the tool perforation in a radial direction.

Wherein, the joint portion extends axially over a length slightly shorter than the mouth of a conventional cartridge, the screw hole is used to connect with the mouth of the cartridge, and the front end of the mouth of the cartridge is selectively moved towards the tool portion within the joint portion and applies a compressive force to the tool member.

Wherein, the mouth of the cartridge is screwed and displaced towards the tool member and compresses one of the sides of the tool member.

Wherein, the inner diameter of the screw hole is between 0.8 cm and 1 cm.

Wherein, a tool recess is radially recessed on any circumference of the tool portion, and one of the sides of the tool recess is connected to the opening of the screw hole; and the tool member is in the shape of scissors, and the other end of the tool member exhibits an open and closed state when an operating end is pressed, and an operating end of the tool member is optionally placed in the tool recess and the operating end is adjacent to the opening of the screw hole.

Wherein, the mouth of the cartridge is screwed and displaced towards the tool member and compresses the operating end of the tool member.

DETAILED DESCRIPTION OF THE PREFERRED EMBODIMENTS

Figure 1:
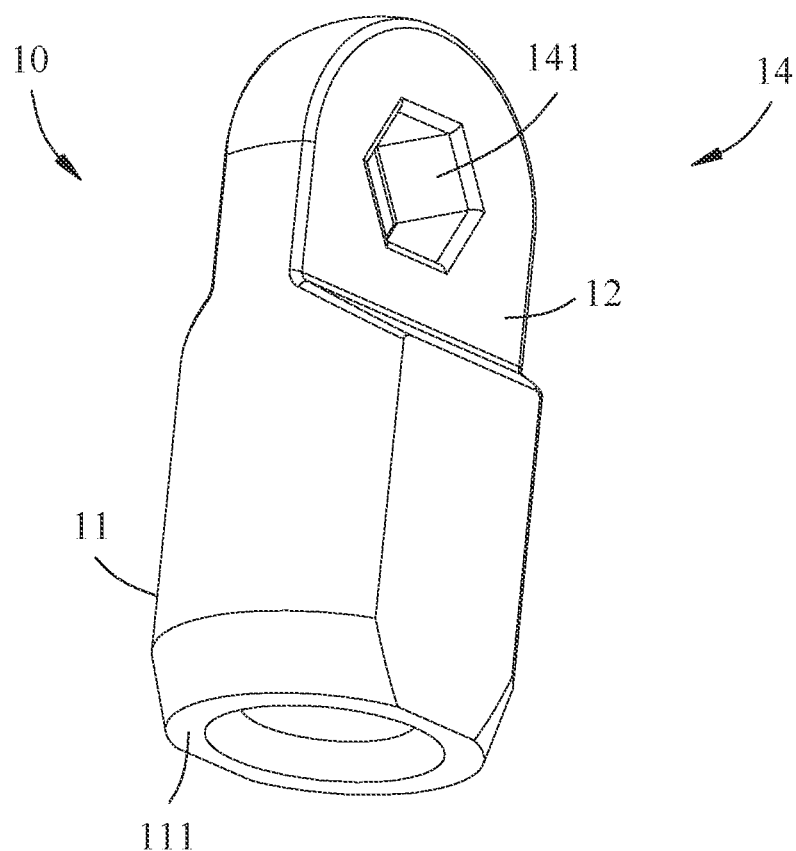
FIG. 1 is an elevational view of the preferred embodiment of the present invention.
Figure 2:
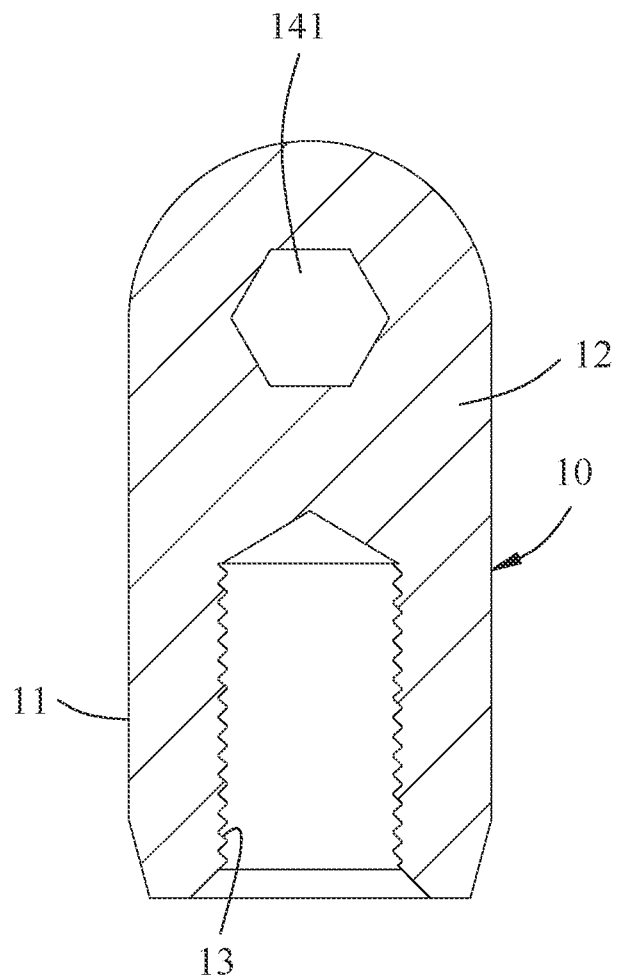
FIG. 2 is a cross-sectional view of the preferred embodiment of the present invention.

Referring to FIGS. 1 to 2, which are a cartridge tool set provided by the present invention, comprising a body 10 having a joint portion 11 and a tool portion 12 at each end of the body 10. The end face 111 of the joint portion 11 is recessed with a screw hole 13, and the inner surface of the screw hole 13 is formed with a screw surface, wherein the inner diameter of the screw hole is between 0.8 cm and 1 cm.

Figure 3:
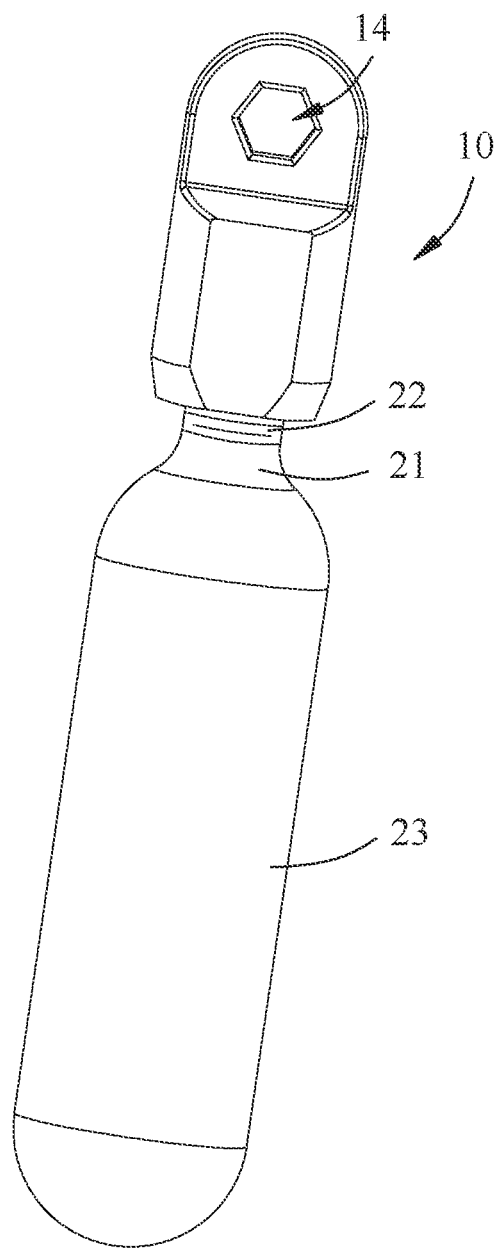
FIG. 3 is a diagram of the first example of the use of the preferred embodiment of the present invention.
Figure 4:
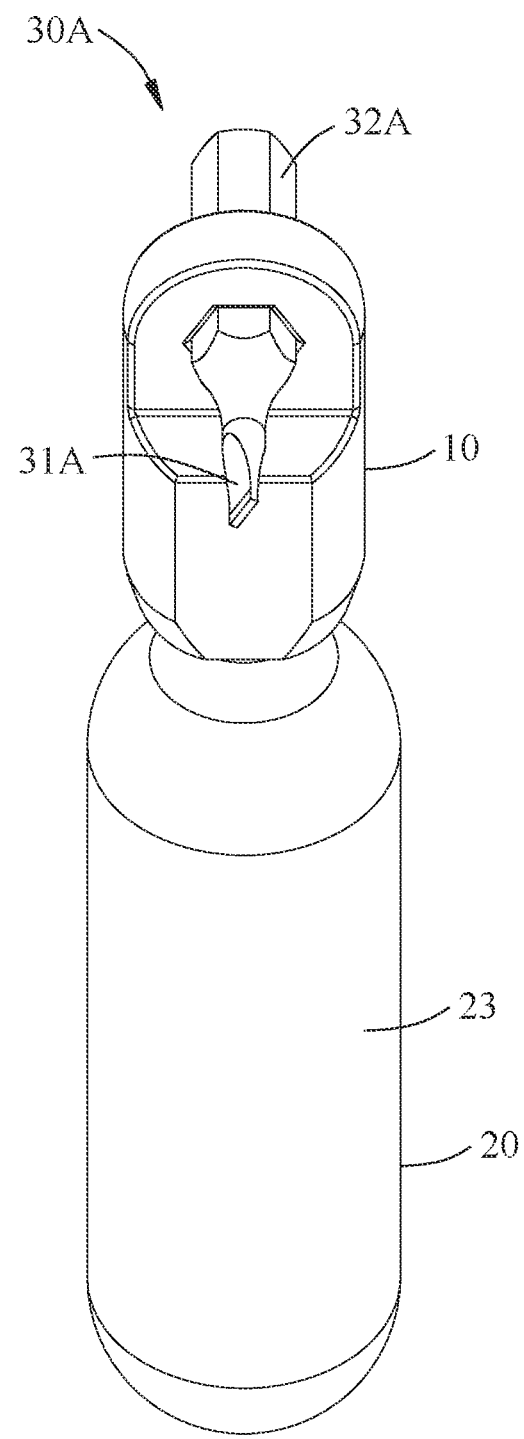
FIG. 4 is a diagram of the second example of the use of the preferred embodiment of the present invention.

Then, with reference to FIGS. 3 and 4, the body 10 can be connected to the mouth 21 of a cartridge 20 via the joint portion 11, which includes a threaded structure 22 around the periphery of the mouth 21, and the threaded structure 22 can be screwed to the screw hole 13, and the combination of the body 10 and the cartridge 20 forms a cartridge tool set provided by the present invention.

The tool portion 12 may be a tool structure or a tool combination structure 14, wherein the tool structure allows the cartridge tool set to be used substantially as a tool, the shape of the tool structure is not limited, the present invention will describe it in further for each embodiment of the tool structure. In this embodiment, the shape of the tool combination structure 14 is not limited, which can be a tool perforation 141 radially through a free end of the tool portion 12 and can be detachably connected to a conventional screwdriver head 30A via the tool combination structure 14.

The two ends of the screwdriver head 30A include a head 31A and a joint portion 32A, wherein the head 31A usually appears as a flathead, cross-shaped, polygonal structures, etc., which are commonly used for screwing a screw, and the outer periphery of the joint portion 32A is a polygonal profile, and the polygonal profile and the tool perforation are fitted by concave and convex, so that the screwdriver head 30A can be detachably connected to the tool combination structure using the joint portion 32A.

In use, after the body 10 is connected to the screwdriver head 30A, a user can hold the body 23 of the cartridge 20 as a handle and use the screwdriver head 30A against a work area to be worked, and then the user can use the screwdriver head 30A against the work area to be worked as a pivot and rotate the body 23 in a circular manner so that the screwdriver head 30A can perform an operation on the work area to be worked, this allows the cartridge tool set to further perform the functions similar to those of a driver wrench.

Since the most common joint portion 32A in the market is mostly hexagonal in cross-section, in this embodiment, the tool recess is hexagonal in cross-section, which makes the tool mating kit 10 not only suitable for the screwdriver head 30A assembly according to the need, but also can be widely used in the common screwdriver head 30A in the market.

Figure 5:
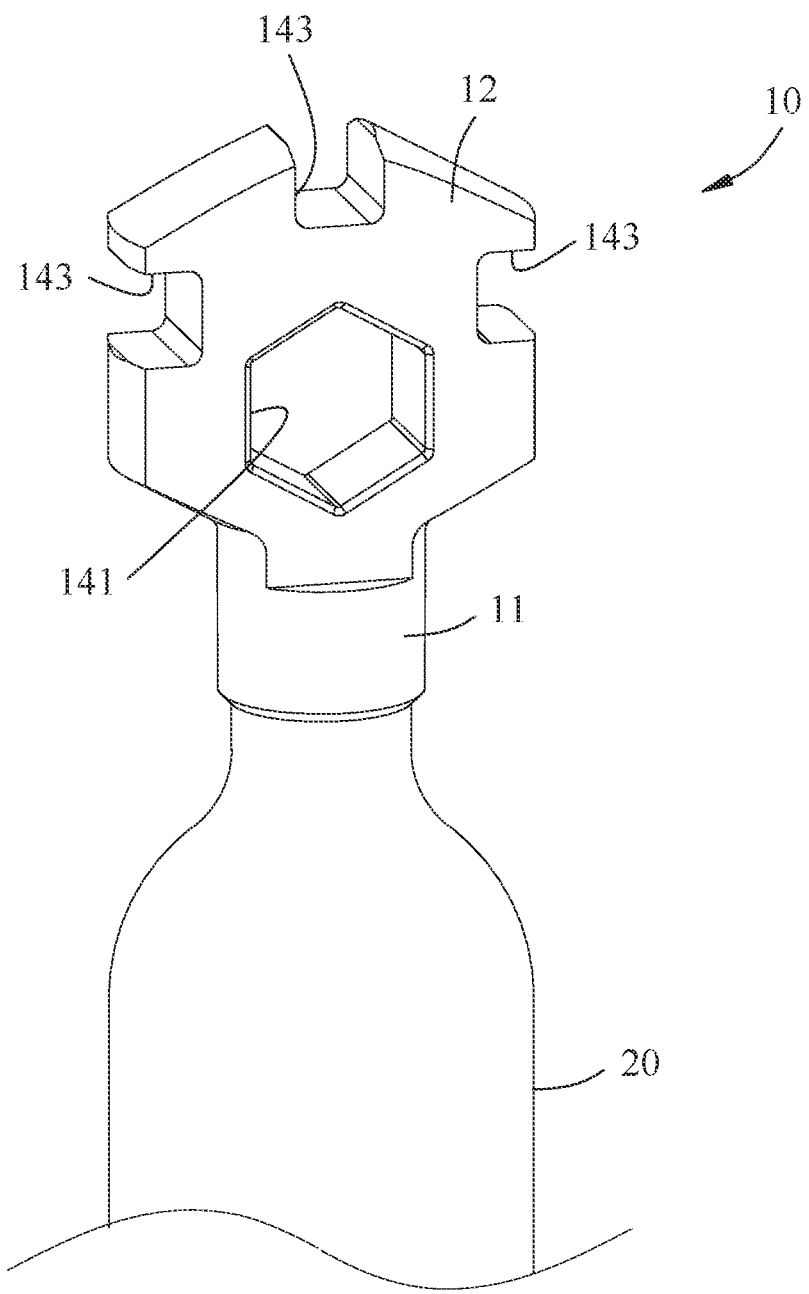
FIG. 5 is an exploded view of the second preferred embodiment of the present invention.

In the second preferred embodiment of the present invention shown in FIG. 5, the tool structure can be a tool notch 143 recessed on any edge of the end of the tool portion 12, and the contour of the tool notch 143 is concave and convex to fit at least a part of a conventional nut so that the tool structure can be used as a wrench; or the opening formed by the tool notch 143 can be equal to the diameter of a valve cap on the conventional bicycle tire, when the bicycle tire is to be inflated, the tool notch 143 can be used to tighten or unscrew the valve cap; or the opening formed by the tool notch 143 can be slightly larger than the width of the chain of the bicycle so that when the chain encounters a fallen chain, it can hold the body 23 and hook the chain with the tool notch 143 and turn the pedal of the bicycle at the same time, and while the pedal of the bicycle is being turned, the chain can be restored.

The tool structure can also be extended in a longitudinal direction and protrude from the end of the tool portion 12, wherein, the thickness of the tool structure is gradually thinned in the longitudinal direction so that the tool structure has formed a flattened shape, and the end of the tool structure is deformed toward one of the sides of the flattened shape to form a tire levering structure, so that when the tire of the bicycle is needed to be removed, it can hold the body 23 and insert the tire levering structure between the tire and the corresponding wheel frame, so that the cartridge tool set can be used as a tire lever.

Figure 6:
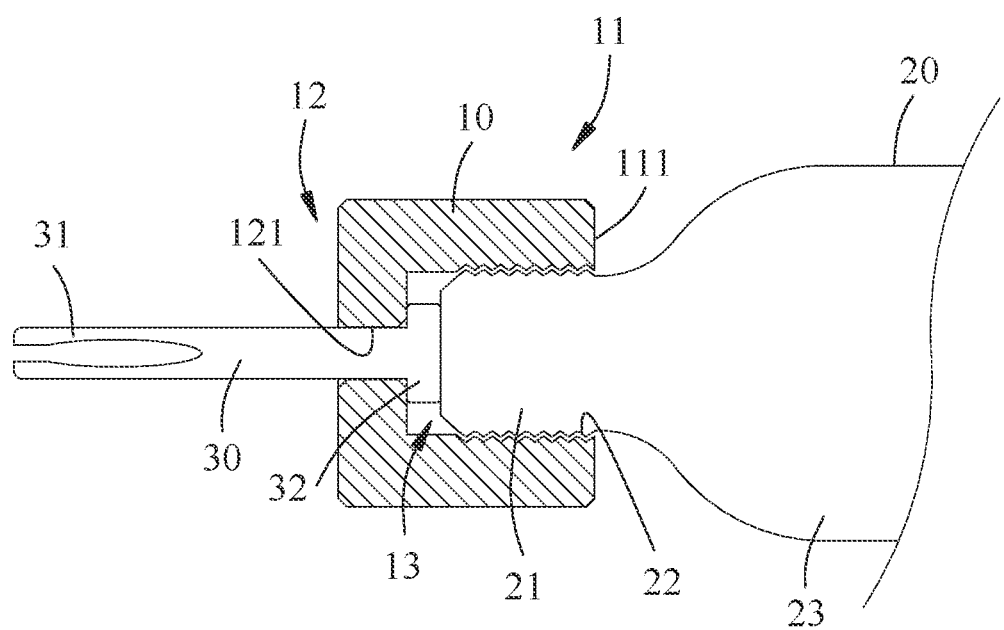
FIG. 6 is a diagram of an example of the use of the third preferred embodiment of the present invention.
Figure 7:
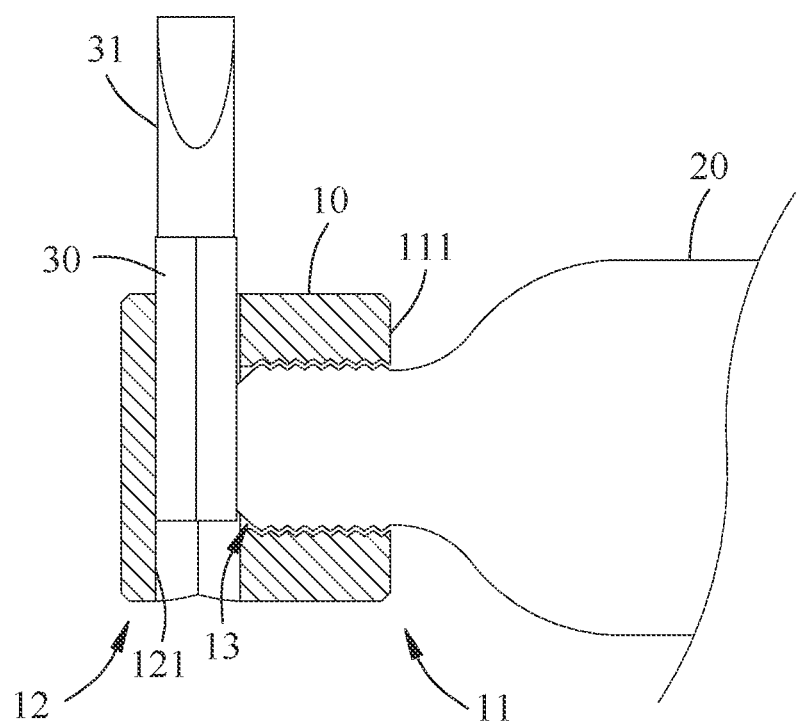
FIG. 7 is a diagram of an example of the use of the fourth preferred embodiment of the present invention.

Referring to FIGS. 6 to 7, which are some embodiments of a cartridge tool set provided by the present invention, the cartridge tool set comprises a body 10 having a joint portion 11 and a tool portion 12 at each end of the body 10. The end face of the joint portion 11 is axially recessed with a screw hole 13 formed with a screw surface on the inner surface of the screw hole 13, and the inner diameter of the screw hole 13 is between 0.8 cm and 1 cm, and the joint portion 11 and the tool portion 12 are connected to each other.

The body 10 is connected to a mouth 21 of a conventional cartridge 20 via the joint portion 11, which includes a threaded structure 22 around the periphery of the mouth 21 which is screwed to the screw hole 13. The length of the joint portion 11 extending along the axis is slightly shorter than that of the mouth 21 of the conventional cartridge 20, so that when the body 10 is connected to the mouth 21, the front end of the mouth 21 can optionally be displaced towards the tool portion 12 or positioned within the tool portion 12. The body 10 can be installed as a cap on the mouth of the cartridge 20 and serve as a protection to prevent the cartridge mouth 21 from being pierced by the sharp end and leaking when the cartridge 20 is stored with other tools.

The body 10 can be connected to a tool member 30 via the tool portion 12, when the tool portion 12 is connected to the tool member 30, the cartridge 20 can provide a compressive force such that the cartridge tool set can be used substantially as a hand tool when the cartridge 20 and the tool member 30 are connected. The shape of the tool portion 12 is not limited, and the present invention will describe it in further for each embodiment of the tool portion 12.

Referring to FIG. 6, which is the third preferred embodiment of the cartridge tool set of the present invention, the tool portion 12 is axially penetrated with a tool perforation 121 along the screw hole 13, and the tool perforation 121 is connected to the screw hole 13. The tool member 30 may be penetrated into the tool perforation 121 and secured to the tool portion 12 by the compressive force provided by the cartridge 20. In this embodiment, the tool member 30 is in the shape of a rod having a tool structural end 31 and a large diameter end 32 formed at each end. The tool structural end 31 may be a common screwdriver head (as shown in FIG. 7) or a tire puncture plug. The large diameter end 32 has at least one diameter larger than the tool perforation 121.

When the third preferred embodiment of the present invention is used, the tool member 30 can have its tool structural end 31 passes through the tool perforation through the screw hole 13 so that the tool structural end 31 protrudes axially from the tool member 30 and the large diameter end 32 remains in the screw hole 13 and abuts against the tool perforation 121. The cartridge 20 is then connected to the body through the screw hole 13, and since the axially extending length of the joint portion 11 is shorter than the mouth 21, the cartridge 20 can be displaced in the direction of the tool portion 12 until the mouth 21 presses against the large diameter end 32 and provides the compressive force on the tool member 30, so that the tool member 30 can be fixed corresponding to the body 10 by the compressive force.

After the tool member 30 of the body 10 is pressed and fixed by the cartridge 20, a user can hold the body 23 of the cartridge 20 as a handle and use the tool structural end 31 corresponding to the work area to be worked. For example, in this embodiment, the tool structural end 31 is the tire puncture plug, and the user can hold the body 23 and place the tire-repairing end corresponding to the work area to be worked to perform the tire-repairing operation and demonstrate the tire-repairing function.

Referring to FIG. 7, which is the fourth preferred embodiment of the cartridge tool set of the present invention, differing from the above, the tool perforation 121 radially penetrates the tool portion 12, and one of the sides of the tool perforation 121 is connected to the opening of the screw hole 13. The tool member 30 can be placed within the tool perforation 121 in a radial direction, and when the cartridge 20 is connected to the body 10, the cartridge 20 can be displaced in the direction of the tool portion 12, and let the front end of the mouth 21 is deepened into the tool perforation 121 and pressed against the tool member 30, thereby generating the compressive force which can fix the tool member 30 to the body 10.

For example, in this embodiment, the tool structural end 31 is the screwdriver head, the user can hold the body 23 as the handle and use the screwdriver head against a work area to be worked, and then the user can use the screwdriver head against the work area to be worked as a pivot and rotate the body 23 in a circular manner so that the screwdriver head 30 can perform an operation on the work area to be worked, this allows the cartridge tool set to further perform the functions similar to those of a driver wrench.

Figure 8A:
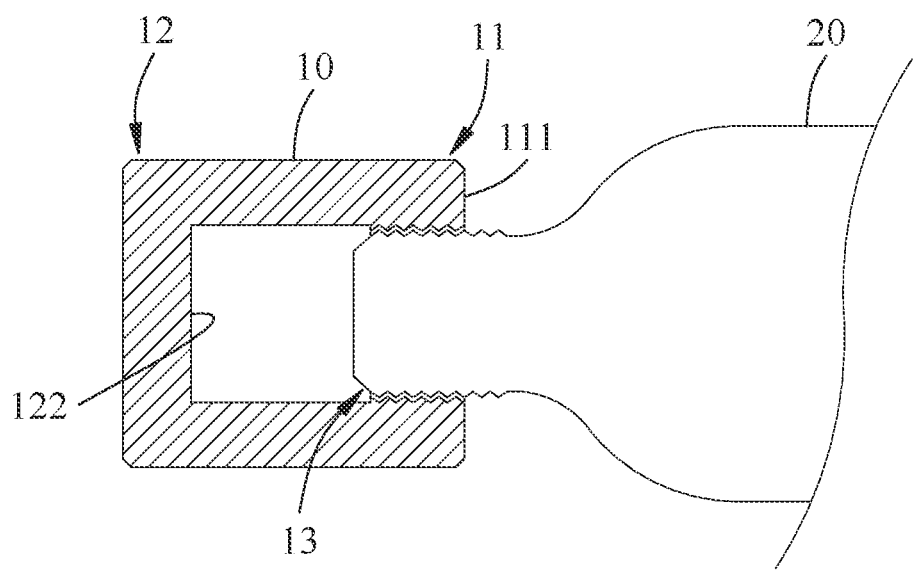
FIG. 8A is a top view of the fifth preferred embodiment of the present invention.
Figure 8B:
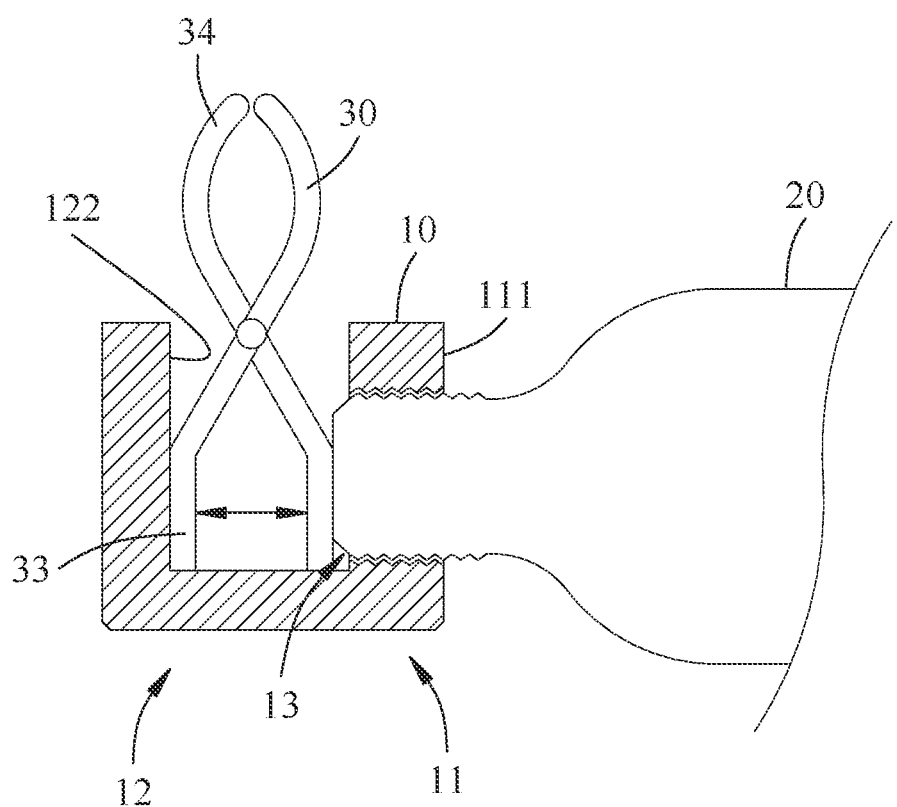
FIG. 8B is a side view of the fifth preferred embodiment of the present invention.

Next, please refer to FIGS. 8A and 8B, which is the fifth preferred embodiment of the cartridge tool set of the present invention applicable when the tool member 30 is a wire cutter. Since a conventional wire cutter requires strong hand pressure on an operating end 33 to open and close a wire cutter nozzle 34 at the other end, in order to achieve a labor-saving effect by using the torque principle, the operating end 33 is often manufactured to be significantly longer than the wire cutter nozzle 34, which is not only inconvenient to carry but also tends to increase the weight.

In this embodiment, a tool recess 122 is recessed on any circumference of the tool portion 12 in a radial direction, and one of the sides of the tool recess is connected to the opening of the screw hole 13. When the cartridge 20 is connected to the body 10, the cartridge 20 can be displaced in the direction of the tool portion 12 and let the front end of the mouth 21 be deepened into the tool recess 122. The wire cutter is placed with the operating end 33 within the tool recess 122 and the operating end 33 is adjacent to the opening of the screw hole 13.

Under this concept, by rotating the mouth 21 for displacement and the interlocking feature between the mouth 21 and the body 10, the cartridge 20 can generate enough pressure to compress the operating end 33 by the mouth 21 and cause the wire cutter nozzle 34 to operate, thereby effectively achieving the effect of saving effort. Also, according to the design, the length of the operating end 33 is further shortened to achieve the effect of reducing the volume and making it easy to carry.

Under this concept, by interlocking the mouth 21 of the cartridge 20 and the screw hole 13, and by rotating the cartridge 20 to move the mouth 21 to close to the tool portion 12, the present invention can achieve the effect of tightly fixing the operating end 33 of the tool member 30 or the wire cutter nozzle 34, and when the tool member 30 needs to be removed, the mouth 21 can be moved away from the tool portion 12 by rotating the cartridge 20 in the opposite direction.

The cartridge tool set provided by the present invention can be installed as a cap on the mouth 21 of the cartridge 20 and used for a protection purpose when not in daily use, and can be assembled with corresponding tool members and used as a hand tool according to the requirement. Not only can the easy storage function be realized, but also the matching and modular tool members can be further produced to generate multi-functions such as a screwdriver, tire puncture plug, tire lever, wire cutter or repair fallen chain, pump, etc., to achieve the effects of convenient storage, light and easy to carry for the user.

NUMBERS DESCRIPTION

10 Body
11 Joint portion
111 End face
112 Jointing protruding section
113 Combination bump
114 Bump ring wall
1141 Thick wall section
1142 Thin wall section
12 Tool portion
121 Tool perforation
122 Tool recess
123 Combination recess
1231 Circumferential groove bottom
13 Screw hole
14 Tool combination structure
141 Tool perforation
142 Tool recess
1421 Tool thread
143 Tool notch
15 Threaded recesses
20 Cartridge
21 Mouth
22 Threaded structure
23 Body
30 Tool member
30A Screwdriver head
31 Tool structural end
31A Head
32 Large diameter end
32A Joint portion
33 Operating end
34 Wire cutter nozzle

What is claimed is:

1. A cartridge tool, comprising a body with two ends, the body comprising: a joint portion having a screw hole recessed in the end face of the joint portion, the inner diameter of the screw hole is between 0.8 cm and 1 cm; and a tool portion being a tool structure or a tool combination structure, wherein the tool combination structure is used for detachable connecting to a tool member, wherein the tool combination structure comprises a tool perforation extending toward a radial direction.

2. The cartridge tool according to claim 1, wherein the tool combination structure is used for detachably connecting to a screwdriver head.

3. The cartridge tool according to claim 1, wherein the tool perforation cross-section is a hexagonal perforation.

4. The cartridge tool according to claim 1, wherein the tool structure extends in a longitudinal direction and protrudes from a free end of the tool portion, and the thickness of the tool structure gradually thins in the longitudinal direction to form a flattened shape, wherein, the end of the tool structure is deformed toward one of the sides of the flattened shape to form a tire levering structure.

5. The cartridge tool according to claim 1, wherein the tool structure is a tool notch recessed in any edge of the tool portion, wherein the contour of the tool notch is concave and convex to fit at least a part of a nut.

6. The cartridge tool according to claim 1, wherein the tool structure is a tool notch recessed in any edge of the tool portion, wherein an opening formed by the tool notch is equal in size to the diameter of a valve cap on one of the tires of a bicycle.

7. The cartridge tool according to claim 1, wherein the tool structure is a tool notch recessed in any edge of the tool portion, wherein the opening formed by the tool notch is slightly larger than the width of one of the chains of the bicycle.

8. The cartridge tool according to claim 1, wherein the tool perforation is connected to the screw hole.

9. The cartridge tool according to claim 1, wherein the tool member is in the shape of a rod having a tool structural end and a large diameter end formed at each end, the large diameter end having at least one diameter larger than the tool perforation; and when the tool member is connected to the tool portion, the tool structural end passes through the tool perforation via the screw hole and protrudes axially from the tool member, and the large diameter end remains in the screw hole and abuts against the tool perforation.

10. The cartridge tool according to claim 9, wherein one side of the tool perforation is connected to the opening of the screw hole, and the tool member is placed in the tool perforation in a radial direction.

11. The cartridge tool according to claim 9, further comprising a cartridge, wherein the joint portion extends axially over a length slightly shorter than a mouth of the cartridge, the screw hole is used to connect with the mouth of the cartridge, and the front end of the mouth of the cartridge is selectively moved towards the tool portion within the joint portion and applies a compressive force to the tool member.

12. The cartridge tool according to claim 11, wherein the mouth of the cartridge is screwed and displaced towards the tool member and compresses one of the sides of the tool member.

13. The cartridge tool according to claim 1, wherein one side of the tool perforation is connected to the opening of the screw hole, and the tool member is placed in the tool perforation in a radial direction.

14. The cartridge tool according to claim 13, further comprising a cartridge, wherein the joint portion extends axially over a length slightly shorter than a mouth of the cartridge, the screw hole is used to connect with the mouth of the cartridge, and the front end of the mouth of the cartridge is selectively moved towards the tool portion within the joint portion and applies a compressive force to the tool member.

15. The cartridge tool according to claim 1, further comprising a cartridge, wherein the joint portion extends axially over a length slightly shorter than a mouth of the cartridge, the screw hole is used to connect with the mouth of the cartridge, and the front end of the mouth of the cartridge is selectively moved towards the tool portion within the joint portion and applies a compressive force to the tool member.

16. The cartridge tool according to claim 15, wherein the mouth of the cartridge is screwed and displaced towards the tool member and compresses one of the sides of the tool member.

17. The cartridge tool according to claim 1, wherein:
a tool recess is radially recessed on any circumference of the tool portion, and one of the sides of the tool recess is connected to the opening of the screw hole; and
the tool member is in the shape of scissors, and the other end of the tool member exhibits an open and closed state when an operating end is pressed, and an operating end of the tool member is optionally placed in the tool recess and the operating end is adjacent to the opening of the screw hole.

\* \* \* \* \*